(12) United States Patent
Kubica

(10) Patent No.: US 7,260,455 B2
(45) Date of Patent: *Aug. 21, 2007

(54) SYSTEM FOR OPERATING AN AIRCRAFT

(75) Inventor: Francois Kubica, Toulouse (FR)

(73) Assignee: Airbus France S.A.S., Toulouse (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/715,855

(22) Filed: Nov. 19, 2003

(65) Prior Publication Data

US 2004/0153220 A1 Aug. 5, 2004

Related U.S. Application Data

(63) Continuation of application No. 09/863,894, filed on May 24, 2001, now Pat. No. 6,694,230.

(30) Foreign Application Priority Data

May 29, 2000 (FR) .................................. 00 06828

(51) Int. Cl.
*G06F 17/00* (2006.01)

(52) U.S. Cl. ....................................................... 701/11

(58) Field of Classification Search .................... 701/1, 701/3–9, 11–12, 15–16, 23–25; 244/3.15, 244/158, 4 R, 6, 75 R–76 R, 175–178, 180–186, 244/196–197, 220–225, 234–237
See application file for complete search history.

(56) References Cited

U.S. PATENT DOCUMENTS

| | | | |
|---|---|---|---|
| 4,463,605 A * | 8/1984 | McDowell et al. ........ 73/866.4 |
| 4,748,392 A | 5/1988 | Goicoechea | |
| 4,750,127 A * | 6/1988 | Leslie et al. ................... 701/16 |
| 5,197,697 A | 3/1993 | Lyloc et al. | |
| 5,428,543 A | 6/1995 | Gold et al. | |
| 5,714,948 A | 2/1998 | Farmakis et al. | |
| 5,774,818 A * | 6/1998 | Pages ............................ 701/3 |
| 6,003,811 A * | 12/1999 | Trikha .......................... 244/78 |
| 6,276,640 B1 | 8/2001 | Laffisse et al. | |
| 6,694,230 B2 * | 2/2004 | Kubica ......................... 701/11 |
| 2002/0002428 A1 | 1/2002 | Kubica | |

FOREIGN PATENT DOCUMENTS

EP 0 573 106 A1 12/1993

* cited by examiner

*Primary Examiner*—Thu V. Nguyen
(74) *Attorney, Agent, or Firm*—Oblon, Spivak, McClelland, Maier & Neustadt, P.C.

(57) ABSTRACT

A system for operating an aircraft includes a navigation computer and a flight control computer. The navigation computer receives guidance instructions and guidance parameters, and outputs automatic pilot instructions. The flight control computer receives control instructions and the automatic pilot instructions, and generates operating commands based on the automatic pilot instructions in an automatic pilot mode.

25 Claims, 2 Drawing Sheets

SYSTEM FOR OPERATING AN AIRCRAFT

CROSS-REFERENCE TO RELATED APPLICATIONS

This application is a continuation application of published U.S. application Ser. No. 09/863,894, filed May 24, 2001, now U.S. Pat. No. 6,694,230 which claims priority under 35 U.S.C. § 119 to French Patent Application 00 06828, filed on May 29, 2000, the entire disclosure of both of which are incorporated herein by reference.

BACKGROUND OF THE INVENTION

1. Field of the Invention

The present invention relates to aircraft with electrical fly-by-wire controls and, more particularly, to the architecture of the flight control system for such aircraft.

2. Discussion of the Background

It is known that an aircraft with electrical fly-by-wire controls has controls, such as sticks, ministicks, rudder bars, etc., equipped with electrical transducers so that they generate electrical control instructions which represent the action that a pilot exerts on them. It also includes a computer of flight control commands which, on the basis of the electrical control instructions generated by the controls and of control parameters originating, for example, from sensors, produces electrical operating commands that the flight control computer applies to actuators tasked with moving the control surfaces of the aircraft.

It is also commonplace for such an aircraft to have an automatic pilot capable, under certain circumstances, of piloting the aircraft in place of the pilot. As is also known, an automatic pilot consists essentially of a navigation computer and of a control computer. The navigation computer receives guidance instructions (indicated to it by the pilot) and guidance parameters (sent to it by sensors or by an inertial unit, for example), and from these guidance instructions and parameters produces automatic pilot instructions. For its part, the control computer converts these automatic pilot instructions into commands for operating the automatic pilot, which it applies to the actuators of the control surfaces of the aircraft.

Depending on the known embodiments of automatic pilots, the commands for operating the automatic pilot are applied to the actuators either directly or via the flight control computer. In the latter case, it will be noted that the flight control computer receives, from the automatic pilot, the commands for operating the automatic pilot which have already been fully produced and that in consequence its role amounts simply to transmitting the automatic pilot control commands unmodified.

Whichever of these two embodiments is on board the aircraft, it must also, however, be pointed out that, in such a known architecture, it is necessary to provide two control functions, namely one for the flight control computer and the other for the automatic pilot. Aside from the fact that this gives rise to significant costs, it may happen, owing to constraints of the system, that the control functions differ, particularly as regards the calculation power, the acquisition of parameters, the monitoring, etc. It is therefore compulsory to develop and to validate two control functions. In addition, a structure such as this does not make it possible to minimize the delays between the inertial information and the operating commands given by the automatic pilot to the control surfaces.

SUMMARY OF THE INVENTION

An object of the present invention is to overcome these drawbacks.

To this end, according to an embodiment of the invention, an aircraft with electrical fly-by-wire controls, equipped with control surfaces capable of being moved by electrically operated actuators, includes controls and a flight control computer. The controls are actuated by a pilot and generate electrical control instructions which are sent to the flight control computer. The flight control computer generates, from the electrical control instructions and from control parameters, operating commands sent to the actuators to move the control surfaces.

The aircraft also includes an automatic pilot capable of piloting the aircraft in place of the pilot and exerting a navigation function making it possible to produce automatic pilot instructions from the guidance instructions and guidance parameters sent to it. The automatic pilot can also exert a control function which consists in producing, from the automatic pilot instructions, automatic pilot operating commands sent to the actuators to move the control surfaces.

The automatic pilot can consist exclusively of calculation means producing the automatic pilot instructions from the guidance instructions and the guidance parameters. The calculation means are connected directly to the flight control computer so as to send the automatic pilot instructions to the latter. The flight control computer, from the automatic pilot instructions, produces the automatic pilot operating commands and sends these commands to the actuators to cause them to move the control surfaces accordingly.

Thus, according to the present invention, the control computer of the automatic pilot is eliminated and it is the flight control computer which fulfils the control function of the automatic pilot. The invention therefore makes it possible to develop and validate just one control function, the latter being embedded in the flight control computer. In addition it makes it possible to minimize the delay between the inertial information and the commands issued to the control surfaces by the automatic pilot. Furthermore, it also offers the possibility of making the responses of the aircraft under manual piloting consistent with those with the automatic pilot in operation.

As a preference, in order to simplify the structure of the flight control computer as far as possible, the electrical control instructions from the controls and the automatic pilot instructions from the calculation means of the automatic pilot are, by pairs, of the same nature. For example, the calculation means of the automatic pilot produce, from the guidance instructions and the guidance parameters, three automatic pilot instructions which correspond respectively to a commanded vertical load factor, to a commanded roll rate and to a commanded yaw. The controls generate three electrical control instructions which are respectively consistent with a commanded vertical load factor, with a commanded roll rate and with a commanded yaw.

BRIEF DESCRIPTION OF THE DRAWINGS

The figures of the appended drawing will make it easy to understand how the invention may be embodied. In these figures, identical references denote elements which are similar.

DESCRIPTION OF THE PREFERRED EMBODIMENTS

Figure 1:
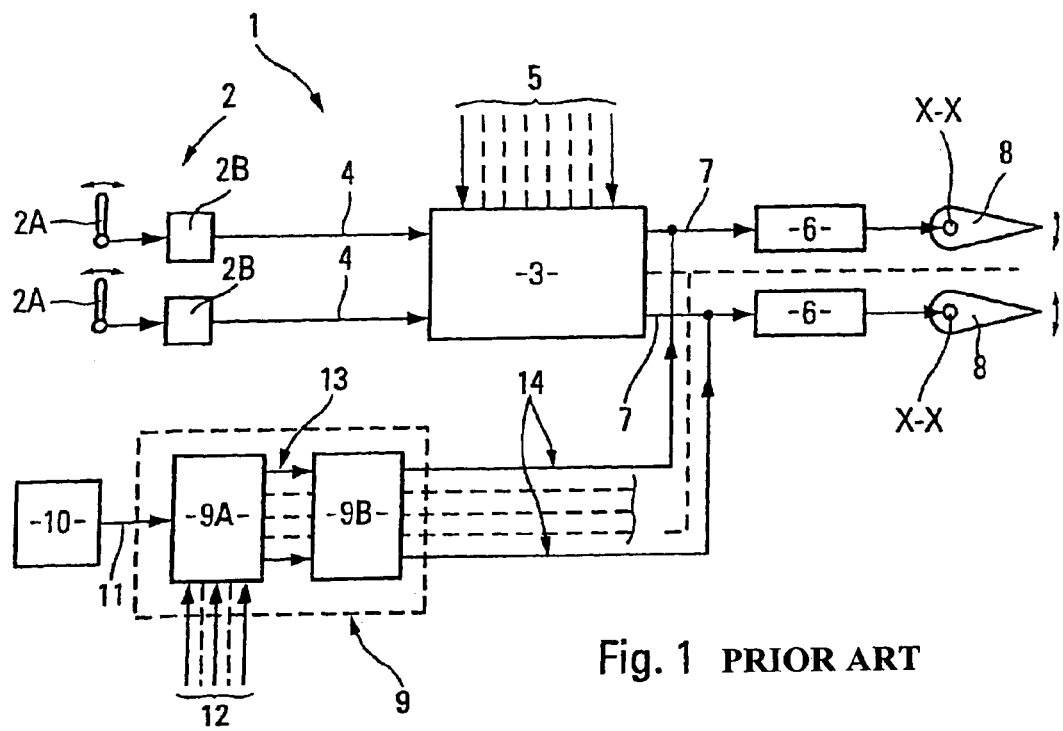
FIGS. 1 and 2 schematically illustrate two known architectures of an aircraft electrical fly-by-wire system.

The known architecture 1 of an electrical fly-by-wire system for an aircraft (not depicted) essentially includes controls 2 including elements 2A such as ministicks, rudder bars, etc., intended to be actuated by a pilot (not depicted) and associated with transducers 2B generating electrical control instructions representative of the movements of the elements 2A. A flight control computer 3 receives in the usual way, via links 4, the electrical control instructions generated by the controls 2, and via links 5 receives control parameters from sensors, other computers, etc. and which, from the electrical control instructions and the control parameters, generates operating commands. An actuators 6 receives the operating commands via links 7 and which move the control surfaces 8 of the aircraft accordingly, for example in rotation about axes X-X. An automatic pilot 9 includes a navigation computer 9A and a control computer 9B.

The navigation computer 9A receives, from a device 10, guidance instructions which are put up by the pilot and transmitted thereto by links 11. It also receives guidance parameters sent to it from the sensors, other computers, etc. by lines 12. From the guidance instructions and the guidance parameters, the navigation computer 9A produces automatic pilot instructions which it sends to the control computer 9B via links 13. The control computer 9B, from these automatic pilot instructions, produces commands for operating the automatic pilot, which it sends to the actuators 6, via links 14, so as to move the control surfaces 8.

Figure 2:
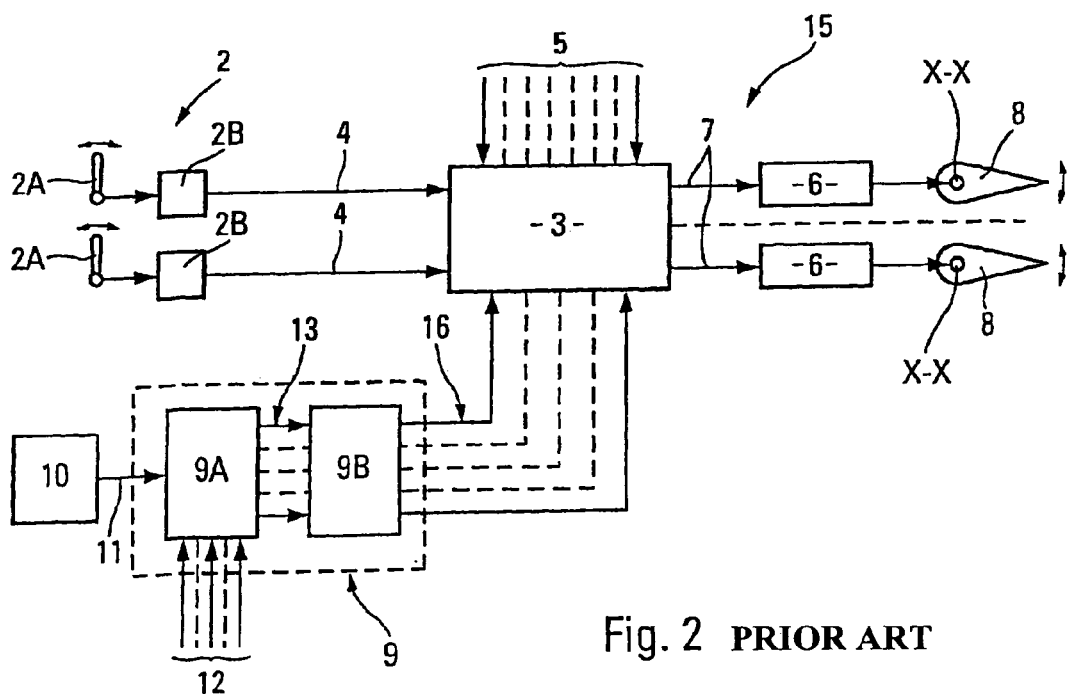

In an alternative form of embodiment 15, which is also known and shown in FIG. 2, all of the elements 2 to 13 described with reference to FIG. 1 can again be seen. The only difference compared with the architecture of the latter figure lies in the fact that the commands for operating the automatic pilot, produced by the control computer 9B, instead of being sent directly to the actuators 6 via the links 14, are sent there indirectly via the flight control computer 3. What actually happens is that links 16 connect the outputs of the control computer 9B to the flight control computer 3. Thus, the latter receives, from the control computer 9B, the commands for operating the automatic pilot which have been filly produced, and transmits them, without modifying them, to the actuators 6, via the links 7. The transmission through the flight control computer 3 is passive, and is equivalent to that performed by the lines 14 in FIG. 1.

Figure 3:
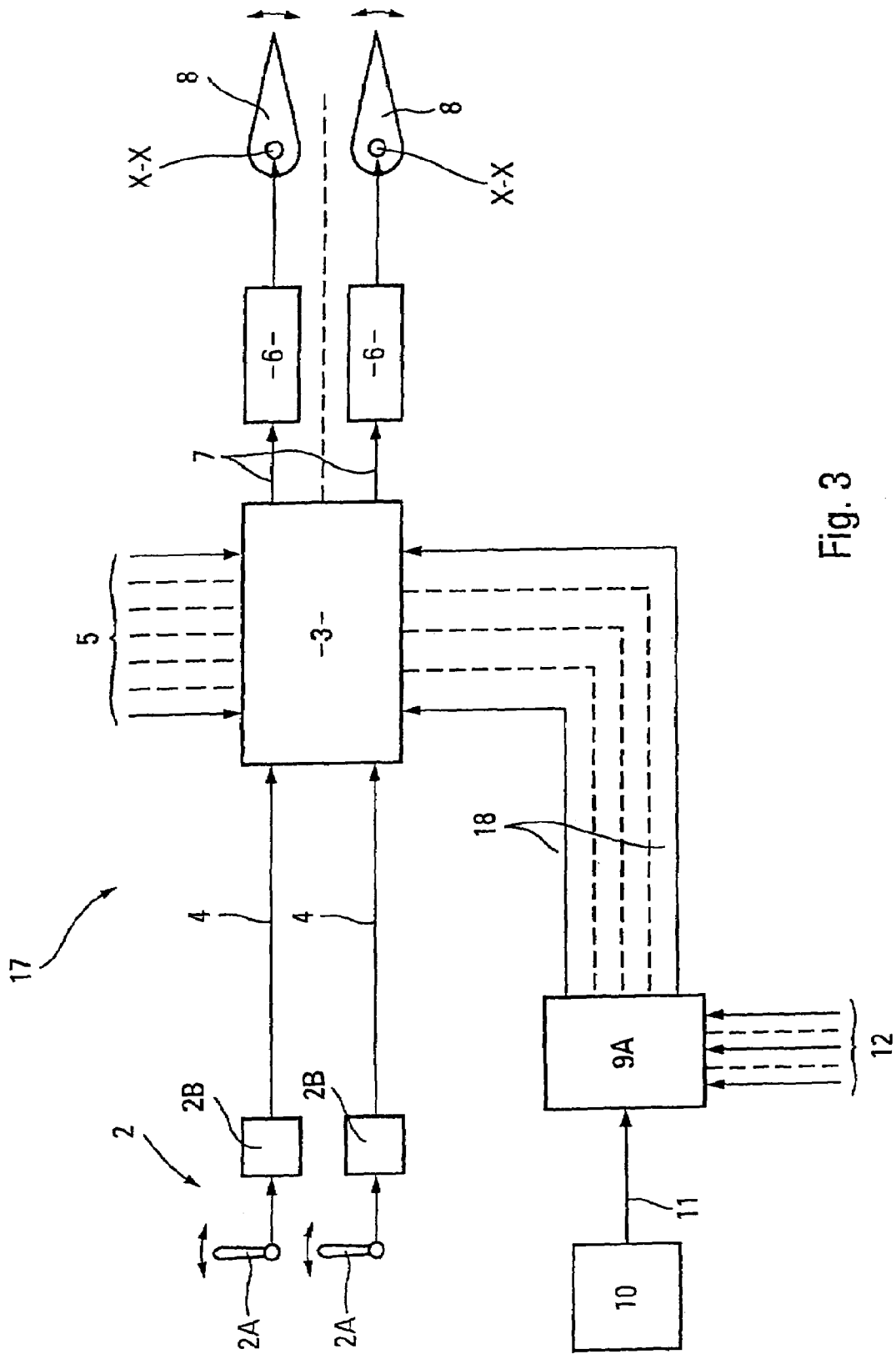
FIG. 3 schematically illustrates the architecture of the electrical fly-by-wire system according to the present invention.

The architecture 17 according to the present invention and illustrated schematically in FIG. 3 includes all the elements 2 to 8 and 10 to 12 described hereinabove. By contrast, the control computer 9B and the associated links 13, 14, 16 have been omitted.

In the architecture 17, the automatic pilot instructions produced by the navigation computer 9A are sent directly to the flight control computer 3 by links 18. From these automatic pilot instructions, the flight control computer 3, in a similar way to what occurs with the electrical control instructions from the controls 2, produces commands for operating the automatic pilot, which it sends to the actuators 6 via the links 7.

From guidance (heading, vertical speed, altitude, etc.) instructions sent to it by the device 10, the navigation computer 9A calculates three automatic pilot instructions, namely a commanded vertical load factor, a commanded roll rate and a commanded yaw. The latter instructions are sent, via the links 18, to the flight control computer 3 which produces the automatic turning commands for the control surfaces 8 (elevator, stabilizer, ailerons, rudder, etc.).

Moreover, the controls 2 (sticks, rudder bars, etc.) produce control instructions which are respectively consistent with a commanded vertical load factor, a commanded roll rate and a commanded yaw. These control instructions are also sent to the flight control computer 3, which produces the turn commands for the control surfaces 8.

What is claimed is:

1. A system for operating an aircraft, comprising:
  a navigation computer comprising:
    a first input configured to receive guidance instructions including heading, vertical speed, and altitude,
    a second input configured to receive guidance parameters, and
    an output configured to output automatic pilot instructions computed by said navigation computer from said guidance instructions;
  a flight control computer comprising:
    a first input configured to receive control instructions,
    a second input configured to receive said automatic pilot instructions, and
    a command generator configured to generate a first plurality of operating commands based on said automatic pilot instructions in an automatic pilot mode; and
  a dedicated communication link configured to transmit the automatic pilot instructions from the navigation computer to the flight control computer,
  wherein said automatic pilot instructions correspond in nature to said control instructions.

2. The system of claim 1, wherein said command generator is configured to generate a second plurality of operating commands based on said control instructions in a manual pilot mode.

3. The system of claim 1, wherein said flight control computer further comprises a third input configured to receive control parameters.

4. The system of claim 1, wherein said command generator is configured to generate said first and second pluralities of operating commands based on a single control function.

5. The system of claim 4, wherein said single control function is embedded in said flight control computer.

6. The system of claim 1, wherein said navigation computer generates said automatic pilot instructions based on said guidance instructions and on said guidance parameters.

7. The system of claim 1, wherein said automatic pilot instructions and said control instructions correspond to a commanded vertical load factor.

8. The system of claim 1 wherein said automatic pilot instructions and said control instructions correspond to a commanded roll rate.

9. The system of claim 1, wherein said automatic pilot instructions and said control instructions correspond to a commanded yaw.

10. A system for operating an aircraft, comprising:
  a navigation computer comprising:
    means for receiving guidance instructions including heading, vertical speed, and altitude,
    means for receiving guidance parameters, and
    means for outputting automatic pilot instructions computed by said navigation computer from said guidance instructions;
a flight control computer comprising:
  means for receiving control instructions,
  means for receiving said automatic pilot instructions, and
  means for generating a first plurality of operating commands based on said
  automatic pilot instructions in an automatic pilot mode; and
dedicated communication means for transmitting the automatic pilot instructions from
  the navigation computer to the flight control computer,
wherein said automatic pilot instructions correspond in nature to said control instructions.

11. The system of claim 10, wherein said flight control computer further comprises means for generating a second plurality of operating commands based on said control instructions in a manual pilot mode.

12. The system of claim 10, wherein said flight control computer further comprises means for receiving control parameters.

13. The system of claim 10, wherein said first and second pluralities of operating commands are based on a single control function.

14. The system of claim 13, wherein said single control function is embedded in said flight control computer.

15. The system of claim 10, wherein said navigation computer further comprises means for generating said automatic pilot instructions based on said guidance instructions and on said guidance parameters.

16. The system of claim 15, wherein said automatic pilot instructions correspond to a commanded vertical load factor, commanded roll rate, and a commanded yaw.

17. The system of claim 16, wherein said control instructions correspond to a commanded vertical load factor, commanded roll rate, and a commanded yaw.

18. A system for operating an aircraft, comprising:
  a navigation computer configured to receive guidance instructions and parameters, and to output automatic pilot instructions;
  a flight control computer configured to receive control instructions and said automatic pilot instructions, and to generate a first plurality of operating commands based on said automatic pilot instructions in an automatic pilot mode; and
  a dedicated communication link configured to transmit the automatic pilot instructions from the navigation computer to the flight control computers
wherein said automatic pilot instructions correspond in nature to said control instructions.

19. The system of claim 18, wherein said flight control computer is configured to generate a second plurality of operating commands based on said control instructions in a manual pilot mode.

20. The system of claim 18, wherein said flight control computer further comprises a third input configured to receive control parameters.

21. The system of claim 18, wherein said flight control computer is configured to generate said first and second pluralities of operating commands based on said single control function.

22. The system of claim 18, wherein said navigation computer generates said automatic pilot instructions based on said guidance instructions and on said guidance parameters.

23. The system of claim 18, wherein said automatic pilot instructions and said control instructions correspond to a commanded vertical load factor.

24. The system of claim 18, wherein said automatic pilot instructions and said control instructions correspond to a commanded roll rate.

25. The system of claim 18, wherein said automatic pilot instructions and said control instructions correspond to a commanded yaw.

* * * * *